United States Patent [19]

Shah

[11] Patent Number: 4,843,271
[45] Date of Patent: Jun. 27, 1989

[54] CONDUCTIVE METAL INSERTS IN ROTOR DYNAMOELECTRIC MACHINE

[75] Inventor: Manoj R. Shah, Latham, N.Y.

[73] Assignee: General Electric Company, Schenectady, N.Y.

[21] Appl. No.: 130,866

[22] Filed: Dec. 10, 1987

[51] Int. Cl.[4] .............................................. H02K 3/48
[52] U.S. Cl. ..................................... 310/217; 310/45; 310/156; 310/192; 310/261
[58] Field of Search ............... 310/261, 262, 264, 265, 310/267, 42, 196, 156, 214, 45, 203, 195, 216, 218, 198, 201, 208, 44, 179, 192, 105, 64

[56] References Cited

U.S. PATENT DOCUMENTS

| | | | |
|---|---|---|---|
| 4,242,610 | 12/1980 | McCarty | 310/156 |
| 4,275,324 | 6/1981 | Flick | 310/214 |
| 4,332,079 | 6/1982 | Silver | 310/156 |
| 4,336,649 | 6/1982 | Glaser | 310/156 |
| 4,339,874 | 7/1982 | McCarty | 310/156 |
| 4,363,986 | 12/1982 | Joho | 310/214 |
| 4,486,678 | 12/1984 | Olson | 310/265 |
| 4,631,435 | 12/1986 | McCarty | 310/156 |

FOREIGN PATENT DOCUMENTS 0127567 7/1984 Japan .................................. 310/261

Primary Examiner—R. Skudy
Attorney, Agent, or Firm—Jerome C. Squillaro

[57] ABSTRACT

A rotor of a dynamoelectric machine includes a coating of a high-conductivity metal covering a substantial portion of the surface thereof. The high-conductivity metal reduces resistive heating produced by eddy currents from high-frequency harmonics of an AC power source. In one embodiment of the invention, surfaces of dovetail wedges retaining energizing conductors in logitudinal slots are coated with a copper coating. The pole regions of the rotor include undercut slots to retain chamfered wedges of magnetic material coated with a high-conductivity metal. Retaining rings at opposed ends of the rotor may also be coated with a high-conductivity metal.

10 Claims, 7 Drawing Sheets

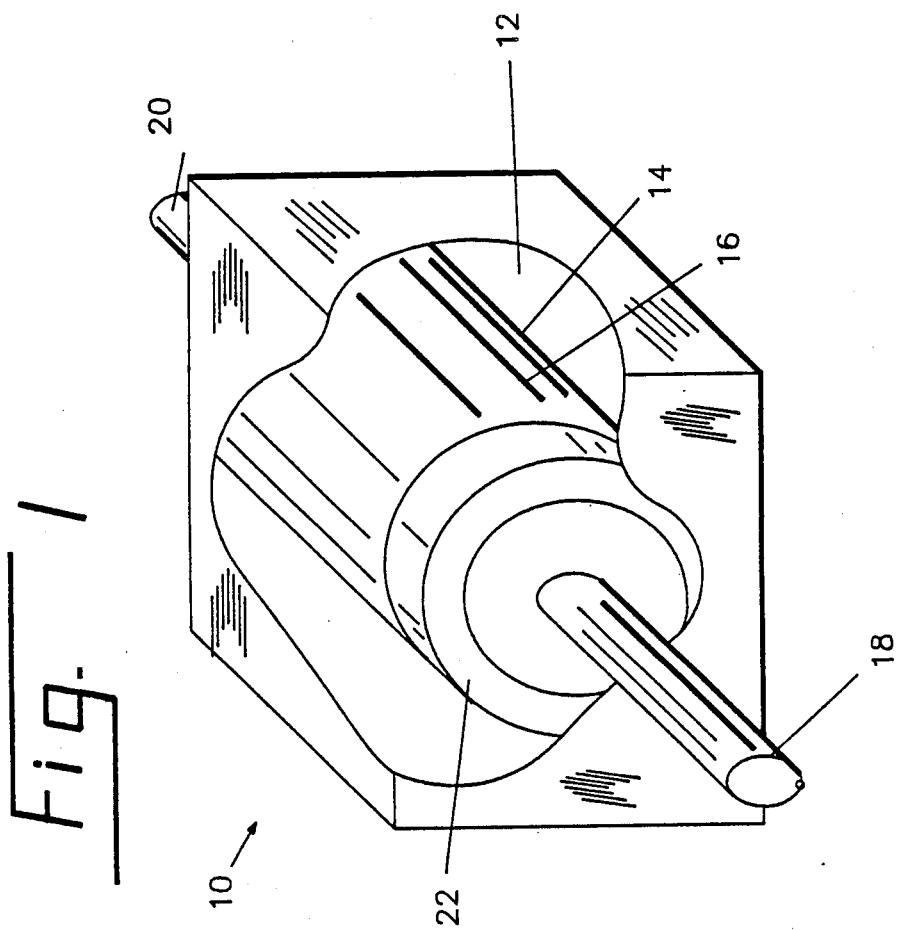

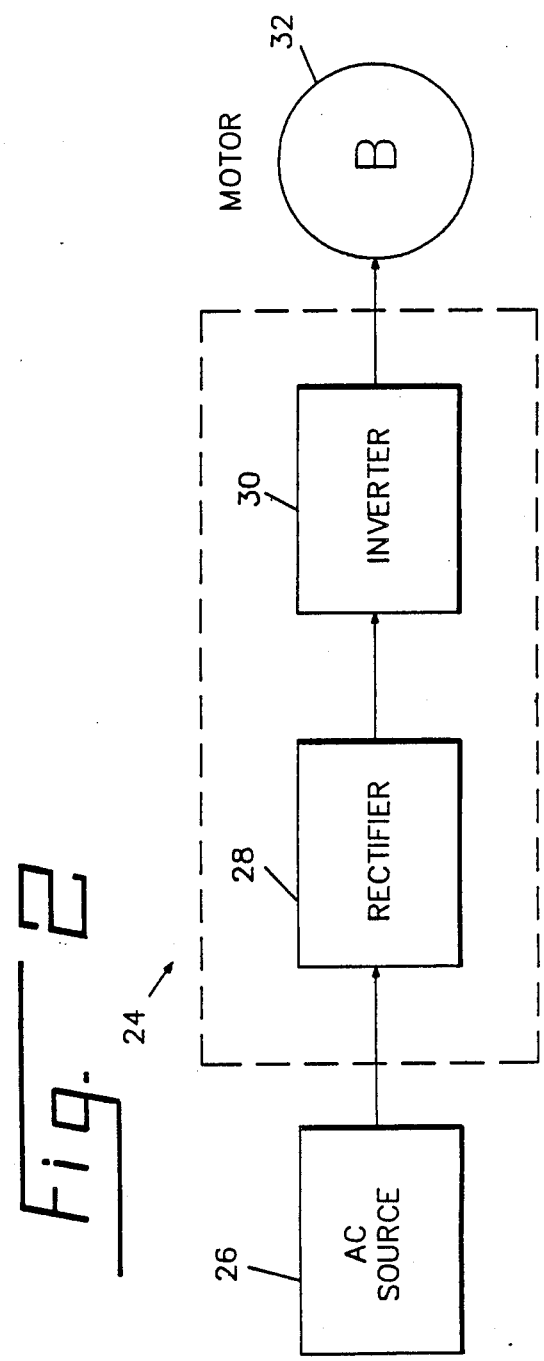

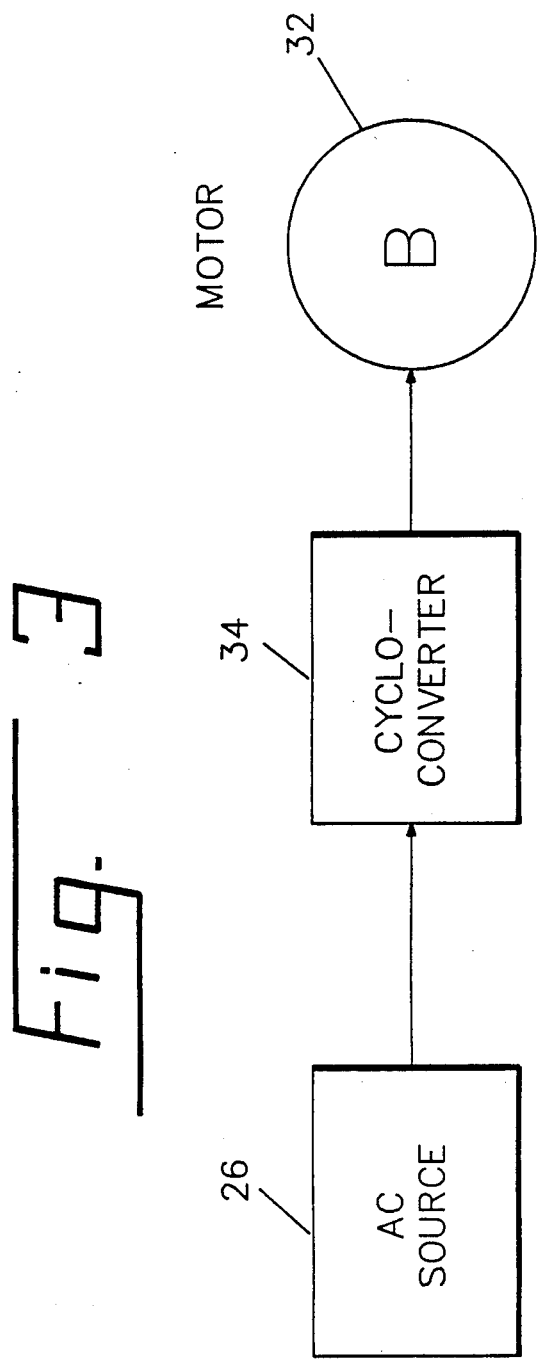

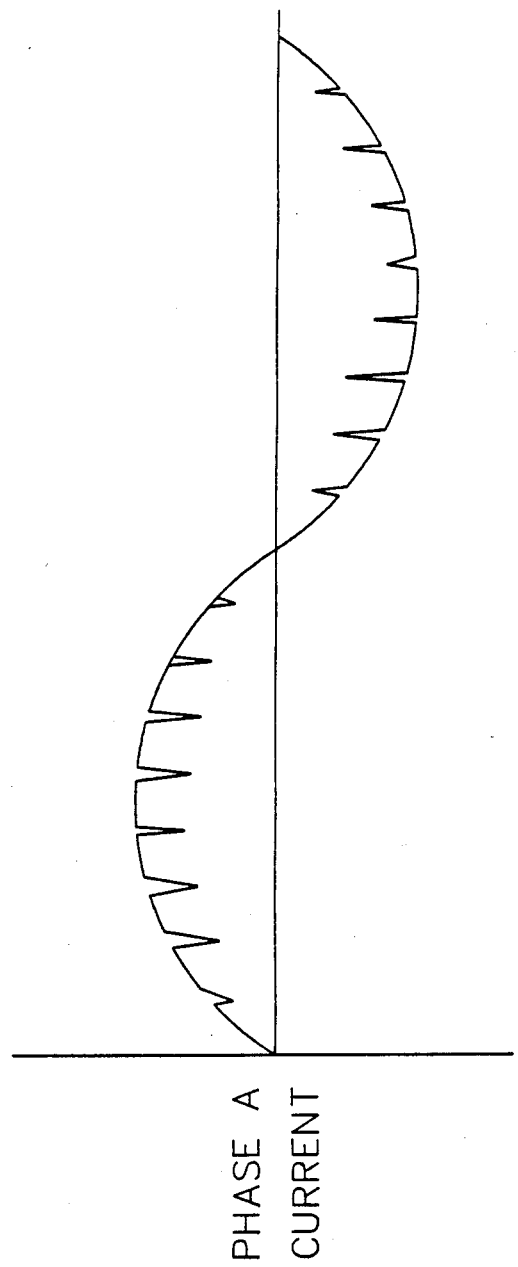

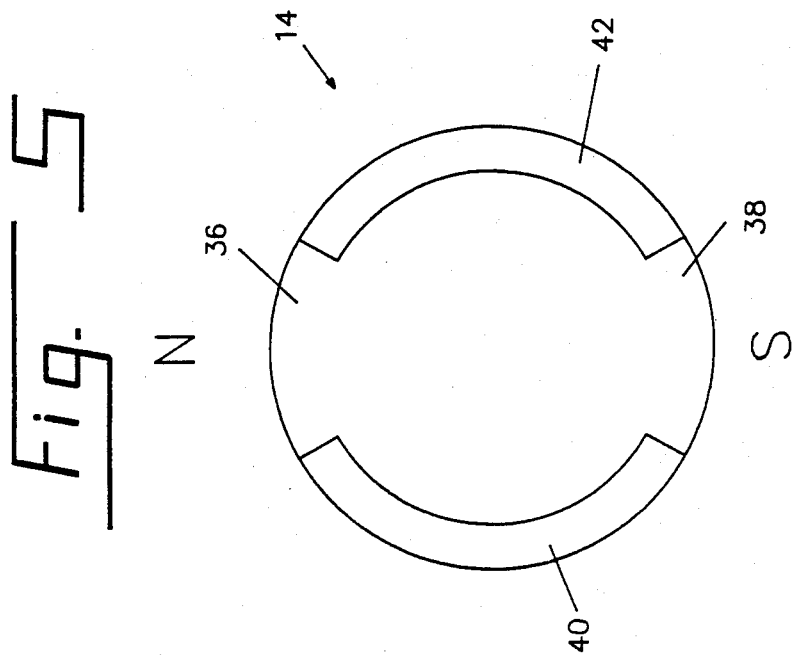

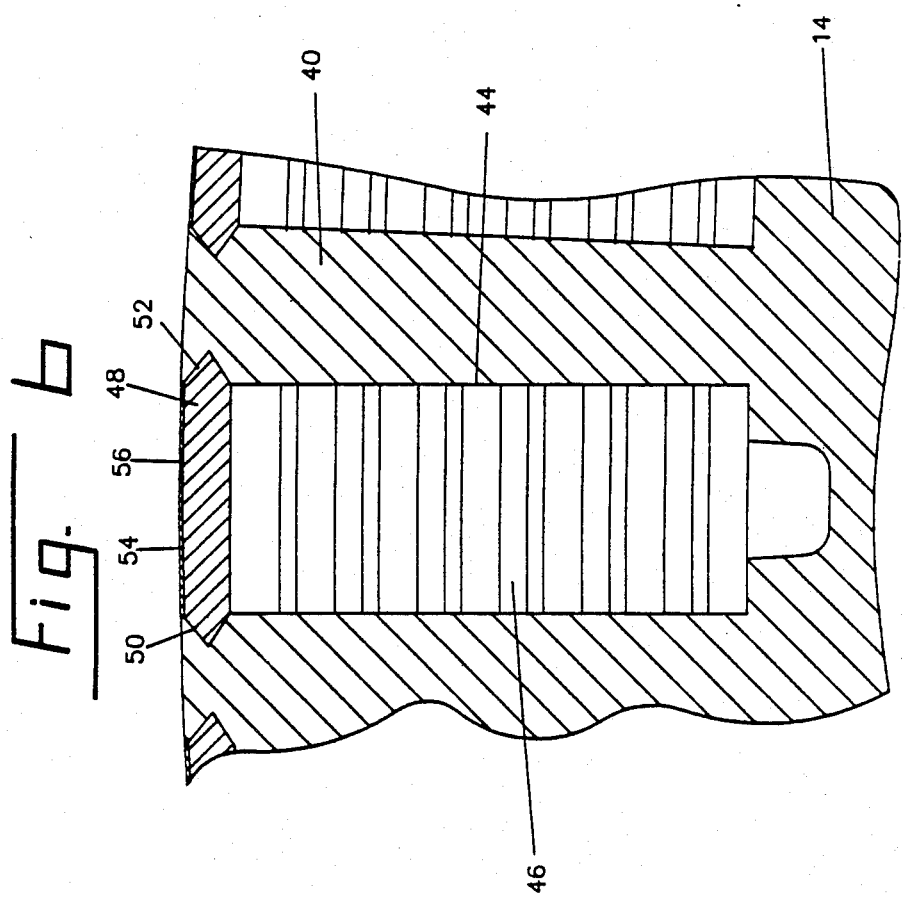

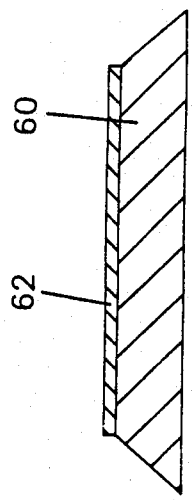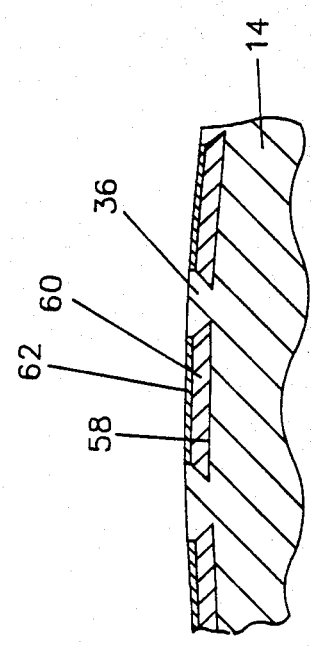

CONDUCTIVE METAL INSERTS IN ROTOR DYNAMOELECTRIC MACHINE

BACKGROUND OF THE INVENTION

The present invention relates to dynamoelectric machines and, more particularly to rotors of AC dynamoelectric machines.

The dynamoelectric machine may be either a motor or a generator. For concreteness, the present invention is described in the environment of a motor. It will be understood that the following description is equally applicable to a generator.

A conventional motor employs a rotor made of a solid forging of magnetic metal in which field windings are inset into longitudinal slots for carrying an energizing DC current to produce magnetic poles in the rotor. The rotor spins in the center of a stator, typically formed by stacking a large number of laminations of magnetic metal mutually insulated from one another. The stator includes windings energized by AC currents to produce a magnetic field which rotates about the axis of the rotor at a predetermined angular rate.

It is recognized that a time-varying magnetic field is capable of inducing eddy currents in an electrically conductive metal. Most useful magnetic metals exhibit relatively high resistivity. As a result, eddy currents induced in such metals are capable of dissipating large amounts of energy in resistive heating. The strategy for avoiding eddy current losses is different for the stator and rotor of a motor.

At any point on the stator of a motor, a time-varying magnetic field must exist in order to produce the required rotating magnetic field upon which the operation of the machine is based. Excessive eddy current losses are avoided to a large extent in the magnetic mass of the stator by building up the stator from relatively thin, mutually insulated laminations of magnetic metal. The thinness of each lamination, and its insulation from its neighbors, provides an extremely resistive path for severely limiting eddy currents induced therein.

The technique of using laminations to reduce the effects of eddy currents is not available in rotors of large dynamoelectric machines, since the stresses imposed by rapid rotation of a large-diameter rotor cannot be withstood by a laminated structure. Accordingly, it is conventional to form a rotor from a one-piece forging of high-strength magnetic metal. Longitudinal slots are machined in the forging to receive conductors for establishing the magnetic field. At the ends of the rotor, end turns interconnect the conductors. The conductors are held in the slots against the substantial centrifugal acceleration by dovetail wedges driven into dovetail slots near the surfaces of the slots. The end turns are held against centrifugal acceleration by high-strength retaining rings shrink fitted onto the ends of the forging.

Accordingly, the rotor is essentially a large mass of magnetic material in which substantial eddy currents could be generated in the presence of time varying magnetic fields. The retaining rings likewise could be subject to eddy currents.

Eddy currents are not usually a problem in a rotor since the rotor spins synchronously with the rotating magnetic field produced by the stator. Thus, except for relatively small variations due to load variations, each point on the rotor experiences a substantially constant magnetic field. As a consequence, eddy currents are not generated.

Some types of motors employ synthesized waveforms to control an AC motor from a DC source or from an AC source whose frequency is different from that which the motor requires. In one common situation, it is desired to drive an AC induction motor at variable speeds from a constant-frequency AC source. One technique for varying a motor speed includes reducing the amplitude of a constant frequency power source, thereby permitting the motor to slip behind synchronism with the power-source frequency. Unfortunately, as the rotor slips far out of synchronism with the rotating magnetic field, the motor becomes unable to generate a substantial torque. Beyond about six percent difference in the speeds of the rotating magnetic field and the rotor, the torque drops close to zero. Thus, permitting the rotor to slip behind the frequency of the rotating magnetic field has limited utility in many applications.

In a load commutated inverter, a DC source is inverted using switching devices such as, for example, thyristors or silicon-controlled rectifiers, to synthesize an AC power supply having the desired frequency and an approximation of the desired amplitude for application to the stator. Since switching devices are employed to synthesize the AC supply, the AC power thus derived, in addition to a desired fundamental frequency, also contains substantial undesired harmonics. Thus, although a rotor driven at a speed determined by the fundamental frequency of such a supply sees a substantially constant magnetic field from the fundamental frequency, it is nonetheless exposed to substantial variations in magnetic field at the harmonic frequencies. Such harmonic frequencies range from about a few hundred Hz to one or more tens of KHz.

If the available primary power source is an AC source, a load commutated inverter employs a rectifier and filter to produce the required DC prior to inversion.

A cycloconverter produces an AC power output directly from an AC primary source by controlling and switching the AC power to synthesize the desired output waveform. The output waveform, although it contains a fundamental frequency, is also accompanied by substantial higher-frequency harmonics. As in the case of the load commutated inverter, these harmonics can give rise to eddy currents in the rotor, with resultant power losses and heating.

OBJECTS AND SUMMARY OF THE INVENTION

Accordingly, it is an object of the invention to provide a rotor for a dynamoelectric machine which overcomes the drawbacks of the prior art.

It is a further object of the invention to provide a rotor for a dynamoelectric machine including dovetail wedges having an outer coating of a high-conductivity material on an outer surface thereof.

It is a still further object of the invention to provide a rotor for a dynamoelectric machine having a plurality of strips of a high-conductivity material disposed thereon.

It is a still further object of the invention to provide a rotor for a dynamoelectric machine having longitudinal slots in a pole region thereof, and strips of magnetic material disposed on wedges positioned in the slots. The strips of magnetic material include a high-conductivity coating on a radially outer surface thereof.

Briefly stated, the present invention provides a rotor of a dynamoelectric machine having a coating of a high-conductivity metal covering a substantial portion of the surface thereof. The high-conductivity metal reduces resistive heating produced by eddy currents from high-frequency harmonics of a fundamental AC power source. In one embodiment of the invention, surfaces of dovetail wedges retaining energizing conductors in longitudinal slots are coated with a copper coating. The pole regions of the rotor include undercut slots to retain chamfered wedges of magnetic material coated with a high-conductivity metal. Retaining rings at opposed ends of the rotor may also be coated with a high-conductivity metal.

According to an embodiment of the invention, there is provided a rotor for a dynamoelectric machine comprising: a generally cylindrical rotor having at least first and second pole regions and at least first and second conductor regions, the conductor regions containing conductors for producing a magnetic field in the rotor, and a coating of a high-conductivity metal on at least ten percent of a surface area of the cylindrical rotor.

According to a feature of the invention, there is provided a rotor for a dynamoelectric machine comprising: a generally cylindrical rotor having at least first and second pole regions and at least first and second conductor regions, the conductor regions containing conductors for producing a magnetic field in the rotor, a coating of a high-conductivity metal on at least ten percent of a surface area of the cylindrical rotor, the conductor regions each contains a plurality of longitudinal slots having conductors therein, each of the longitudinal slots including a dovetail wedge covering an opening thereof, a high-conductivity coating disposed at least on an outer surface of at least some of the dovetail wedges, the at least first and second pole regions include a plurality of longitudinal slots therein, each of the longitudinal slots including a wedge fitted therein, and the high-conductivity coating is disposed on at least an outer surface of the wedge in at least a substantial number of the wedges.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1 is a perspective view of a dynamoelectric machine, partly cut away to reveal elements of a rotor therein.

FIG. 2 is a simplified block diagram of a current source inverter with which the present invention is capable of working.

FIG. 3 is a simplified block diagram of a cycloconverter system with which the present invention is capable of working.

FIG. 4 is a series of curves illustrating the type of output waveform produced by the cycloconverter system of FIG. 3.

FIG. 5 is a schematic end view of a rotor according to the present invention illustrating the locations of pole and conductor regions in a two-pole rotor.

FIG. 6 is a cross section of the rotor of FIG. 1 taken through a longitudinal slot containing energizing conductors.

FIG. 7 is a cross section of the rotor of FIG. 1 taken through a longitudinal slot in a pole region thereof.

FIG. 8 is an enlarged view of a wedge of FIG. 7.

DETAILED DESCRIPTION OF THE PREFERRED EMBODIMENT

Referring first to FIG. 1, there is shown, generally at 10, a dynamoelectric machine such as, for example, a motor. A stator 12, built up by stacking laminations (not individually shown) surrounds the cylindrical periphery of a rotor 14. Rotor 14 includes a generally cylindrical rotor forging 16 having first and second shafts 18 and 20 extending axially from opposed ends thereof. In some embodiments, shafts 18 and 20 are integrally formed with rotor forging 16. Although not shown, shaft 20 may be connected to drive a DC generator for providing DC power to magnetizing conductors in rotor 14, and shaft 18 may be connected to a load.

A retaining ring 22 is disposed on each end of rotor forging 16 (only retaining ring 22 on the near end of rotor forging 16 is shown) to support end turns (not shown) against centrifugal acceleration due to rapid rotation of rotor 14. It is conventional in some machines to shrink fit retaining rings 22 in place for secure retention. Since such shrink fitting is conventional, further description thereof is unnecessary.

Referring now to FIG. 2, there is shown, generally at 24, a current source inverter with which the present invention may be used. An AC power source 26, which may have a constant frequency, feeds AC power to a rectifier 28. Rectifier 28 produces a DC supply of power for application to an inverter 30. Inverter 30 synthesizes a multi-phase (most commonly a three-phase) AC waveform for application to a motor 32. The synthesized AC waveform may have a controllable amplitude and frequency, whereby it is possible to control the torque and speed available from motor 32. Due to the conventional switching techniques used in inverter 30 for synthesizing the AC waveform, the synthesized AC waveform, besides containing a strong fundamental component at the desired frequency, also contains substantial power in harmonics. As previously noted, the presence of the harmonics exposes rotor 14 (FIG. 1) to a time-varying magnetic field, and thus produces undesired eddy currents therein. One skilled in the art will recognize that suitable systems may replace AC power source 26 and rectifier 28 with a DC generator without affecting the operation of the apparatus.

Referring now to FIG. 3, a cycloconverter 34 is shown operating directly on the AC output of AC power source 26 to produce a synthesized waveform having a controllable amplitude fundamental frequency for driving motor 32. As will be seen in FIG. 4, the waveforms of the three-phase power fed to motor 32 contains a large number of sharp transitions capable of producing many harmonic components.

I have discovered that the relatively high frequencies of the harmonics produced in the systems of FIGS. 2 and 3 tend to confine the eddy currents to the surface of rotor 14. This is caused by skin effect usually associated with high frequencies. Skin effect tends to confine high-frequency power to the surface, leaving the interior of a conductor substantially current-free. With this realization, if the surface of rotor 14 were covered with a coating of a high-conductivity material such as, for example, silver or copper, any eddy currents produced in rotor 14 would pass through the high-conductivity coating. Since the amount of heating and power dissipation varies as the resistance of the conductor through which it passes, substituting a high-conductivity material for the conduction of a large portion of the eddy currents produced in the magnetic material below it, would reduce the power dissipation and heating by a very substantial amount. I have calculated that a copper coating covering the entire surface of rotor 14 would reduce power dissipation from eddy currents by factors of from 20 to about 25.

Referring again momentarily to FIG. 1, it is difficult to coat the entire surface of rotor 14 with a coating of a high-conductivity metal having sufficient thickness and tenacity to withstand the high-acceleration environment to which the surface of rotor 14 is exposed. One commercially available technique which appears to be satisfactory is explosive bonding.

Present commercial explosive-bonding techniques are incapable of coating large objects such as rotor forging 16 for a large motor 10. Thus, alternate techniques must be found for providing a high-conductivity coating on rotor forging 16. It may be possible to coat retaining rings 22 by explosive bonding, if desired.

The present invention should not be seen as limited to any particular technique for applying a conductive coating. Other techniques may be, or become, available for coating objects as large as rotor forging 16 or retaining rings 22 with a satisfactory conductive coating. The present invention should be considered to extend to apparatus coated by such other techniques as well as the illustrative techniques recited herein.

Referring now to FIG. 5, an end view of a rotor 14 is shown, in schematic form to illustrate the regions thereof to be discussed in the following. Rotor 14 is a substantially solid forging, having pole regions 36 and 38 magnetized by DC magnetizing currents in conductor bars (not shown) in conductor regions 40 and 42. In conventional rotors, pole regions 36 and 38 are part of the forging. Conductor regions 40 and 42 contain longitudinal slots (not shown) in which the conductor bars are held against centrifugal acceleration by dovetail wedges fitted into dovetail slots in the edges near the tops of the longitudinal slots.

Referring now to FIG. 6, conductor region 40 (as well as conductor region 42, not shown in FIG. 6) includes a plurality of longitudinal slots 44, each containing a plurality of current-carrying conductor bars 46. A dovetail wedge 48 is fitted into a pair of opposed dovetail slots 50 and 52 atop conductor bars 46 to retain conductor bars 46 in longitudinal slot 44.

As is conventional, dovetail wedges 48 are of high-strength non-magnetic material such as, for example, stainless steel or beryllium-copper alloy. Such materials have high resistivities. An outer surface 54 of each dovetail wedge 48 includes a high-conductive coating 56 of, for example, copper. Each dovetail wedge 48 should extend unbroken from one end of its dovetail slot 50 to the other. It will be noted that, although they do not cover the entire surface of rotor 14 in conductor region 40, outer surfaces 54 are close enough together to cover a substantial fraction of such surface. In one embodiment, about 60 to 70 percent of the surface of conductor region 40 is represented by high-conductive coating 56. This high conductivity material over such a large portion of the surface of conductor region 40 reduces eddy-current losses by about a factor of ten.

Referring now to FIGS. 7 and 8, pole region 36 (as well as 38, not shown in FIG. 7) are smooth and unbroken in conventional rotors. In rotor 14, according to the present invention, a plurality of longitudinal slots 58 each contains a wedge 60. Each wedge 60 includes a high-conductivity surface coating 62 on an outer surface thereof. In contrast to dovetail wedges 48 (FIG. 6) in conductor region 40, wedges 60 are not required to retain massive conductor bars beneath them. Accordingly, longitudinal slots 58 and wedges 60 may be made relatively thin in the radial direction and relatively wide in the tangential direction. The transverse edges of wedges 60 are chamfered to mate with undercut portions at the transverse edges of longitudinal slots 58 to help retain wedges 60 against centrifugal acceleration. It is important that the presence of wedges 60 have minimum impact on the magnetic circuit of the machine. Accordingly, wedges 60 are preferably of a magnetic metal and, most preferably, of the same metal from which rotor 14 is made. Each wedge 60 preferably extends unbroken from one end of rotor 14 to the other.

The thickness required in high-conductive coating 56 (FIG. 6) and high-conductivity surface coating 62 (FIG. 8) depends on the frequencies of the harmonics, as well as mechanical factors to prevent sloughing off of the conductive coating. As the harmonic frequency increases, the depth to which induced eddy currents penetrates is reduced. The thickness may also vary with the magnitude of the eddy currents. As of the date of filing of the present invention, I believe that a thickness of copper of from about 50 to about 250 thousandths of an inch satisfies the requirements for most motors. This should not be taken to exclude thinner and thicker coatings from the scope of the invention.

In the preferred embodiment, from 60 to 100 percent of rotor forging 16, and all of retaining rings 22 are covered by coatings of high-conductivity metal to reduce heating from resistive dissipation of eddy-currents. I believe that a measurable reduction in heating may be realized with as little as 10 percent of the surface area of rotor 14 covered by a high-conductivity coating.

Having described preferred embodiments of th invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A rotor for a dynamoelectric machine comprising:
   a generally cylindrical rotor having at least first and second pole regions and at least first and second conductor regions;
   said conductor regions containing conductor for producing a magnetic field in said rotor;
   a coating of a high-conductivity metal on at least ten percent of a surface area of said cylindrical rotor;
   each of said conductor regions contains a plurality of longitudinal slots having conductors therein;
   each of said longitudinal slots includes a wedge covering an opening thereof; and,
   said high-conductivity coating metal is disposed at least on an outer surface of at least some of said wedges.

2. A rotor according to claim 1 wherein said coating metal is copper.

3. A rotor according to claim 1 wherein said wedges are of non-magnetic material and said high-conductivity coating metal is copper.

4. A rotor according to claim 1 wherein:
   said at least first and second pole regions include a plurality of longitudinal slots therein;

each of said longitudinal slots includes a wedge fitted therein; and said coating metal disposed on at least an outer surface of said wedge in at least a substantial number of said wedges.

5. A according to claim 4 wherein said coating metal is copper.

6. A rotor according to claim 4 wherein said wedge is a magnetic metal.

7. A rotor according to claim 6 wherein said magnetic metal is substantially the same metal as in said first and second pole regions.

8. A rotor according to claim 1 wherein said coating has a thickness of from about 50 to about 250 thousandths of an inch.

9. A rotor according to claim 1, further comprising:

first and second retaining rings at distal ends of said generally cylindrical rotor; and said high-conductivity coating metal covering a substantial portion of outer surfaces of said first and second retaining rings.

10. A rotor for a dynamoelectric machine comprising:

a generally cylindrical rotor having at least first and second pole regions and at least first and second conductor regions;

said conductor regions containing conductors for producing a magnetic field in said rotor;

a coating of a high-conductivity metal on at least ten percent of a surface area of said cylindrical rotor;

said conductor regions each containing a plurality of longitudinal slots having conductors therein;

each of said longitudinal slots including a dovetail wedge covering an opening thereof;

said high-conductivity coating metal disposed at least on an outer surface of at least some of said dovetail wedges;

said at least first and second pole regions include a plurality of longitudinal slots therein;

each of said longitudinal slots including at least one of said wedges fitted therein; and said high-conductivity coating metal disposed on at least an outer surface of a least one of said wedges in at least a substantial number of said wedges.

* * * * *